(12) United States Patent
Delcheccolo et al.

(10) Patent No.: US 6,784,828 B2
(45) Date of Patent: Aug. 31, 2004

(54) NEAR OBJECT DETECTION SYSTEM

(75) Inventors: Michael Joseph Delcheccolo, Westford, MA (US); Mark E. Russell, Westford, MA (US); Walter Gordon Woodington, Lincoln, MA (US); Joseph S. Pleva, Londonderry, NH (US); H. Barteld Van Rees, Needham, MA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/931,631

(22) Filed: Aug. 16, 2001

(65) Prior Publication Data

US 2002/0067287 A1 Jun. 6, 2002

Related U.S. Application Data

(60) Provisional application No. 60/226,160, filed on Aug. 16, 2000.

(51) Int. Cl.[7] ............................................. G01S 13/93
(52) U.S. Cl. ............................. 342/70; 342/71; 342/72; 340/436; 340/903
(58) Field of Search .............................. 342/70, 71, 72, 342/195; 340/435, 436, 903; 701/301

(56) References Cited

U.S. PATENT DOCUMENTS

| | | |
|---|---|---|
| 3,697,985 A | 10/1972 | Faris et al. |
| 3,935,559 A | 1/1976 | Straffon et al. |
| 3,940,696 A | 2/1976 | Nagy |
| 3,974,501 A | 8/1976 | Ritzie |
| 3,978,481 A | 8/1976 | Angwin et al. |
| 4,003,049 A | 1/1977 | Sterzer et al. |
| 4,008,473 A | 2/1977 | Hinachi et al. |
| 4,008,475 A | 2/1977 | Johnson |
| 4,035,797 A | 7/1977 | Nagy |
| 4,063,243 A | 12/1977 | Anderson et al. |

(List continued on next page.)

FOREIGN PATENT DOCUMENTS

| | | |
|---|---|---|
| DE | 196 47 283 | 5/1997 |
| DE | 196 32 889 | 2/1998 |
| DE | 195 23 693 | 5/1998 |
| DE | 198 55 400 | 12/1998 |
| DE | 198 50 128 | 5/1999 |
| EP | 0 398 712 | 5/1990 |
| EP | 0 484 995 | 5/1992 |
| EP | 0 642 190 A1 | 12/1993 |
| EP | 0 784 213 | 1/1996 |
| EP | 0 887 658 | 12/1998 |
| EP | 0 932 052 | 7/1999 |
| EP | 0 978 729 A2 | 2/2000 |
| EP | 0 982 173 | 3/2000 |
| EP | 1 020 989 | 7/2000 |
| FR | 2 709 834 | 9/1993 |
| FR | 2 709 834 | 3/1995 |

OTHER PUBLICATIONS

"Visual surveillance for moving vehicle", Ferryman, J.M.; Maybank, S.J.; Worrall, A.D., Visual Surveillance, 1998, Proceedings 1998 IEEE Workshop on, 1997, pp.: 73–80.*
International Search Report of PCT Application No. PCT/US01/25676 dated Dec. 21, 2001.

(List continued on next page.)

Primary Examiner—John B. Sotomayor
(74) Attorney, Agent, or Firm—Daly, Crowley & Mofford, LLP

(57) ABSTRACT

A near object detection (NOD) system includes a plurality of sensors, each of the sensors for providing detection coverage in a predetermined coverage zone and each of the sensors including a transmit antenna for transmitting a first RF signal, a receive antenna for receiving a second RF signal and means for sharing information between each of the plurality of sensors in the NOD system.

15 Claims, 7 Drawing Sheets

U.S. PATENT DOCUMENTS

| | | | |
|---|---|---|---|
| 4,079,377 A | 3/1978 | zur Heiden et al. | |
| 4,143,370 A | 3/1979 | Yamanaka et al. | |
| 4,209,791 A | 6/1980 | Gerst et al. | |
| 4,217,582 A | 8/1980 | Endo et al. | |
| 4,246,585 A | 1/1981 | Mailloux | |
| 4,308,536 A | 12/1981 | Sims, Jr. et al. | |
| 4,348,675 A | 9/1982 | Senzaki et al. | |
| 4,349,823 A | 9/1982 | Tagami et al. | |
| 4,409,899 A | 10/1983 | Owen et al. | |
| 4,414,550 A | 11/1983 | Tresselt | |
| 4,507,662 A | 3/1985 | Rothenberg et al. | |
| 4,543,577 A | 9/1985 | Tachibana et al. | |
| 4,549,181 A | 10/1985 | Tachibana et al. | |
| 4,622,636 A | 11/1986 | Tachibana | |
| 4,673,937 A | 6/1987 | Davis | |
| 4,703,429 A | 10/1987 | Sakata | |
| 4,718,558 A | 1/1988 | Castaneda | |
| 4,901,083 A | 2/1990 | May et al. | |
| 4,962,383 A | 10/1990 | Tresselt | |
| 4,970,653 A | 11/1990 | Kenue | |
| 4,994,809 A | 2/1991 | Yung et al. | |
| 5,008,678 A | 4/1991 | Herman | |
| 5,014,200 A | 5/1991 | Chundrlik et al. | |
| 5,023,617 A | 6/1991 | Deering | |
| 5,045,856 A | 9/1991 | Paoletti | |
| 5,115,245 A | 5/1992 | Wen et al. | |
| 5,134,411 A | 7/1992 | Adler | |
| 5,138,321 A | 8/1992 | Hammer | |
| 5,173,859 A | 12/1992 | Deering | |
| 5,189,426 A | 2/1993 | Asbury et al. | |
| 5,235,316 A | 8/1993 | Qualizza | |
| 5,249,027 A | 9/1993 | Mathur et al. | |
| 5,249,157 A | 9/1993 | Taylor | |
| 5,252,981 A | 10/1993 | Grein et al. | |
| 5,268,692 A | 12/1993 | Grosch et al. | |
| 5,280,288 A | 1/1994 | Sherry et al. | |
| 5,285,207 A | 2/1994 | Asbury et al. | |
| 5,302,956 A | 4/1994 | Asbury et al. | |
| 5,315,303 A | 5/1994 | Tsou et al. | |
| 5,325,096 A | 6/1994 | Pakett | |
| 5,325,097 A | 6/1994 | Zhang et al. | |
| 5,339,075 A | 8/1994 | Abst et al. | |
| 5,341,144 A | 8/1994 | Stove | |
| 5,343,206 A | 8/1994 | Ansaldi et al. | 342/70 |
| 5,351,044 A | 9/1994 | Mathur et al. | |
| RE34,773 E | 11/1994 | Dombrowski | |
| 5,390,118 A | 2/1995 | Margolis et al. | |
| 5,394,292 A | 2/1995 | Hayashida | |
| 5,396,252 A | 3/1995 | Kelly | |
| 5,400,864 A | 3/1995 | Winner et al. | |
| 5,410,745 A | 4/1995 | Friesen et al. | |
| 5,414,643 A | 5/1995 | Blackman et al. | |
| 5,451,960 A | 9/1995 | Kastella et al. | 342/59 |
| 5,454,442 A | 10/1995 | Labuhn et al. | |
| 5,467,072 A | 11/1995 | Michael | |
| 5,467,283 A | 11/1995 | Butsuen et al. | |
| 5,471,214 A | 11/1995 | Faibish et al. | |
| 5,479,173 A | 12/1995 | Yoshioka et al. | |
| 5,481,268 A | 1/1996 | Higgins | |
| 5,483,453 A | 1/1996 | Uemura et al. | |
| 5,485,155 A | 1/1996 | Hibino | |
| 5,485,159 A | 1/1996 | Zhang et al. | |
| 5,486,832 A | 1/1996 | Hulderman | |
| 5,493,302 A | 2/1996 | Woll et al. | |
| 5,495,252 A | 2/1996 | Adler | |
| 5,508,706 A | 4/1996 | Tsou et al. | |
| 5,517,196 A | 5/1996 | Pakett et al. | |
| 5,517,197 A | 5/1996 | Algeo et al. | |
| 5,521,579 A | 5/1996 | Bernhard | |
| 5,525,995 A * | 6/1996 | Benner | 342/90 |
| 5,530,447 A | 6/1996 | Henderson et al. | |
| 5,572,428 A | 11/1996 | Ishida et al. | |
| 5,583,495 A | 12/1996 | Ben Lu Lu | |
| 5,587,908 A | 12/1996 | Kajiwara | |
| 5,613,039 A | 3/1997 | Wang et al. | |
| 5,619,208 A | 4/1997 | Tamatsu et al. | |
| 5,625,362 A | 4/1997 | Richardson | |
| 5,627,510 A | 5/1997 | Yuan | |
| 5,633,642 A | 5/1997 | Hoss et al. | |
| 5,654,715 A | 8/1997 | Hayashikura et al. | |
| 5,670,963 A | 9/1997 | Kubota et al. | |
| 5,675,345 A | 10/1997 | Pozgay et al. | |
| 5,678,650 A | 10/1997 | Ishihara et al. | |
| 5,689,264 A | 11/1997 | Ishikawa et al. | |
| 5,712,640 A | 1/1998 | Andou et al. | |
| 5,715,044 A | 2/1998 | Hayes | |
| 5,717,399 A | 2/1998 | Urabe et al. | |
| 5,719,580 A | 2/1998 | Core | |
| 5,731,778 A | 3/1998 | Nakatani et al. | |
| 5,734,344 A | 3/1998 | Yamada | |
| 5,757,074 A | 5/1998 | Matloubian et al. | |
| 5,757,307 A | 5/1998 | Nakatani et al. | |
| 5,767,793 A | 6/1998 | Agravante et al. | |
| 5,771,007 A | 6/1998 | Arai et al. | |
| 5,777,563 A | 7/1998 | Minissale et al. | |
| 5,805,103 A | 9/1998 | Doi et al. | |
| 5,808,561 A | 9/1998 | Kinoshita et al. | |
| 5,808,728 A | 9/1998 | Uehara | |
| 5,818,355 A | 10/1998 | Shirai et al. | |
| 5,839,534 A | 11/1998 | Chakraborty et al. | |
| 5,905,472 A | 5/1999 | Wolfson et al. | |
| 5,923,280 A * | 7/1999 | Farmer | 342/70 |
| 5,926,126 A | 7/1999 | Engelman | |
| 5,929,802 A | 7/1999 | Russell et al. | |
| 5,938,714 A | 8/1999 | Satonaka | |
| 5,940,011 A | 8/1999 | Agravante et al. | |
| 5,949,366 A | 9/1999 | Herrmann | |
| 5,959,570 A | 9/1999 | Russell | |
| 5,977,904 A | 11/1999 | Mizuno et al. | |
| 5,978,736 A | 11/1999 | Greendale | |
| 5,999,092 A | 12/1999 | Smith et al. | |
| 5,999,119 A | 12/1999 | Carnes et al. | |
| 5,999,874 A | 12/1999 | Winner et al. | |
| 6,011,507 A | 1/2000 | Curran et al. | |
| 6,018,308 A | 1/2000 | Shirai | |
| 6,026,347 A | 2/2000 | Schuster | |
| 6,026,353 A | 2/2000 | Winner | |
| 6,028,548 A | 2/2000 | Farmer | |
| 6,037,860 A | 3/2000 | Zander et al. | 340/436 |
| 6,037,894 A | 3/2000 | Pfizenmaier et al. | |
| 6,040,796 A | 3/2000 | Matsugatani et al. | |
| 6,043,772 A | 3/2000 | Voigtlaender et al. | |
| 6,044,321 A | 3/2000 | Nakamura et al. | 701/96 |
| 6,049,257 A | 4/2000 | Hauk | |
| 6,052,080 A | 4/2000 | Magori | |
| 6,057,797 A | 5/2000 | Wagner | |
| 6,069,581 A | 5/2000 | Bell et al. | |
| 6,070,682 A | 6/2000 | Isogai et al. | |
| 6,075,492 A | 6/2000 | Schmidt et al. | |
| 6,076,622 A | 6/2000 | Chakraborty et al. | |
| 6,085,151 A | 7/2000 | Farmer et al. | |
| 6,087,975 A | 7/2000 | Sugimoto et al. | |
| 6,091,355 A | 7/2000 | Cadotte, Jr. et al. | 342/104 |
| 6,097,331 A | 8/2000 | Matsugatani et al. | |
| 6,097,931 A | 8/2000 | Weiss et al. | |
| 6,104,336 A | 8/2000 | Curran et al. | |
| 6,107,956 A | 8/2000 | Russell et al. | |
| 6,114,985 A | 9/2000 | Russell et al. | |
| 6,127,965 A | 10/2000 | McDade et al. | |
| 6,130,607 A | 10/2000 | McClanahan et al. | |
| 6,147,637 A | 11/2000 | Morikawa et al. | |

| | | |
|---|---|---|
| 6,147,638 A | 11/2000 | Rohling et al. |
| 6,154,168 A | 11/2000 | Egawa et al. |
| 6,161,073 A | 12/2000 | Tange et al. |
| 6,163,252 A | 12/2000 | Nishiwaki |
| 6,184,819 B1 | 2/2001 | Adomat et al. |
| 6,188,950 B1 | 2/2001 | Tsutsumi et al. |
| 6,198,426 B1 | 3/2001 | Tamatsu et al. |
| 6,198,434 B1 | 3/2001 | Martek et al. |
| 6,215,438 B1 | 4/2001 | Oswald et al. |
| 6,225,918 B1 | 5/2001 | Kam |
| 6,232,910 B1 | 5/2001 | Bell et al. |
| 6,233,516 B1 | 5/2001 | Egawa |
| 6,252,560 B1 | 6/2001 | Tanaka et al. |
| 6,255,984 B1 | 7/2001 | Kreppold et al. |
| 6,256,573 B1 | 7/2001 | Higashimata |
| 6,259,395 B1 | 7/2001 | Adachi et al. |
| 6,265,990 B1 | 7/2001 | Isogai et al. |
| 6,268,803 B1 * | 7/2001 | Gunderson et al. ......... 340/903 |
| 6,269,298 B1 | 7/2001 | Seto |
| 6,278,400 B1 | 8/2001 | Cassen et al. |
| 6,307,622 B1 | 10/2001 | Lewis |
| 6,317,073 B1 | 11/2001 | Tamatsu et al. |
| 6,317,075 B1 | 11/2001 | Heide et al. |
| 6,317,090 B1 | 11/2001 | Nagy et al. |
| 6,320,547 B1 | 11/2001 | Fathy et al. |
| 6,327,530 B1 | 12/2001 | Nishimura et al. |
| 6,329,952 B1 | 12/2001 | Grace |
| 6,330,507 B1 | 12/2001 | Adachi et al. |
| 6,335,705 B1 | 1/2002 | Grace et al. |
| 6,338,011 B1 | 1/2002 | Furst et al. .................... 701/1 |
| 6,339,369 B1 | 1/2002 | Paranjpe .................... 340/436 |
| 6,345,227 B1 | 2/2002 | Egawa et al. |
| 6,351,702 B1 | 2/2002 | Tange et al. |
| 6,360,158 B1 | 3/2002 | Hanawa et al. ............... 701/93 |
| 6,366,235 B1 | 4/2002 | Mayer et al. |
| 2002/0044082 A1 | 4/2002 | Woodington et al. ......... 342/70 |
| 2002/0049539 A1 * | 4/2002 | Russell et al. .............. 701/301 |
| 2002/0067287 A1 * | 6/2002 | Delcheccolo et al. ....... 340/901 |

OTHER PUBLICATIONS

International Search Report of PCT Application No. PCT/US01/25677 dated Apr. 17, 2002.

Barnett, Roy I. et al., "A Feasibility Study of Stripline–Fed Slots Arranged as a Planar Array with Circular Grid and Circular Boundary", IEEE, 1989, pp. 1510–1515.

Bhattacharyya, Arum, et al. "Analysis of Stripline–Fed Slot–Coupled Patch Antennas with Vias for Parallel–Plate Mode Suppression", IEEE Transcations on Antennas and Propagation, vol. 46, No. 4, Apr. 1998, pp.538–545.

Clouston E.N. et al. "A Triplate Stripline Slot Antenna Developed for Time–Domain Measurements on Phased Arrays", 1998, pp. 312–315.

Das, Nirod K. et al. "Multiport Scattering Analysis of General Multilayered Printed Antennas Fed by Multiple Feed Ports: Part II–Applications", IEEE, 1992, pp.482–491.

Katehi, Pisti B. et al. "Design of a Low Sidelobe Level Stripline Fed Slot Array Covered by a Dielectric Layer", 1989, pp. 978–981.

Kimura, Yuichi et al. "Alternating Phase Single–Layer Slotted Waveguide Arrays at 25GHz Band", IEEE, 1999, pp. 142–145.

Muir, A., "Analysis of Stripline/Slot Transition", Electronics Letter, vol. 26 No. 15, pp.1160–1161.

Sakaibara, Kunio et al. "A Single Layer Slotted Waveguide Array for 22GHz Band Radio System Between Mobile Base Stations", IEEE, 1994, pp.356–359.

Sangster, Alan et al. "A Moment Method Analysis of a Transverse Slot Fed by a Boxed Stripline", (no date) pp. 146–149.

Schaubert, Daniel H. et al. "Moment Method Analysis of Infinite Stripline–Fed Tapered Slot Antenna Arrays with a Ground Plane", IEEE Transactions on Antennas and Propagation, vol. 42, No. 8, Aug. 1994, p.1161.

Smith, Peter "Transverse Slot Radiator in the Ground–Plane of Enclosed Stripline", $10^{th}$ International Conference on Antennas and Propagation 14.17, Apr. 1997, 5 pages.

Theron, Isak Petrus et al. "On Slotted Waveguide Antenna Design at Ka–Band", IEEE Trans. vol. 32, Oct. 1984, pp. 1425–426.

International Search Report of PCT Application No. PCT/US01/42065 dated May 14, 2002.

International Search Report of PCT Application No. PCT/US01/25594 dated May 7, 2002.

G.S. Dow, et al. "Monolithic Receivers with Integrated Temperature Compensation Function", IEEE GaAs IC Symposium, 1991, pp. 267–269.

International Search Report of PCT Application No. PCT/US01/25682 dated May 14, 2002.

* cited by examiner

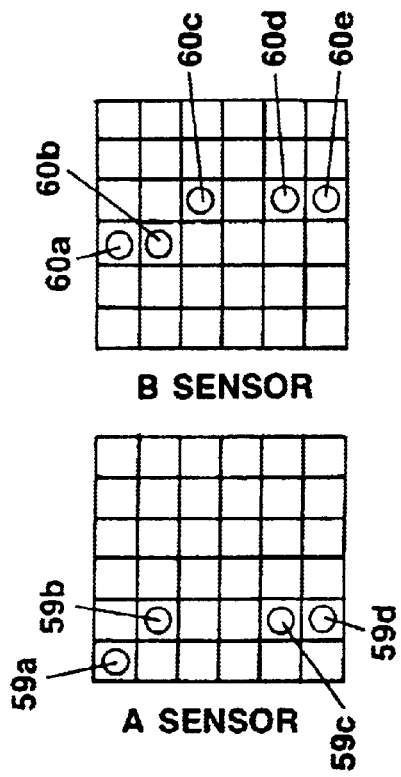
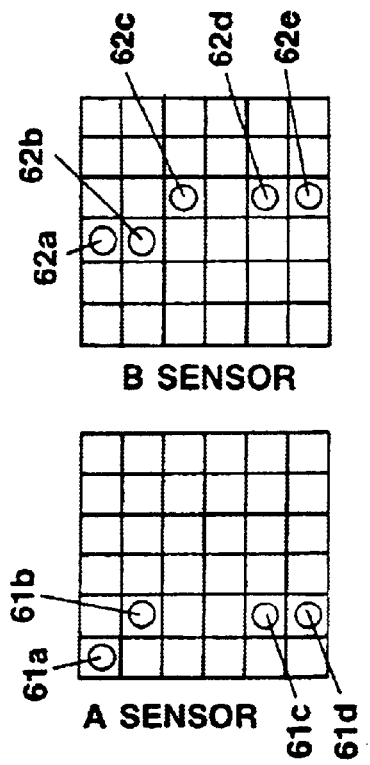
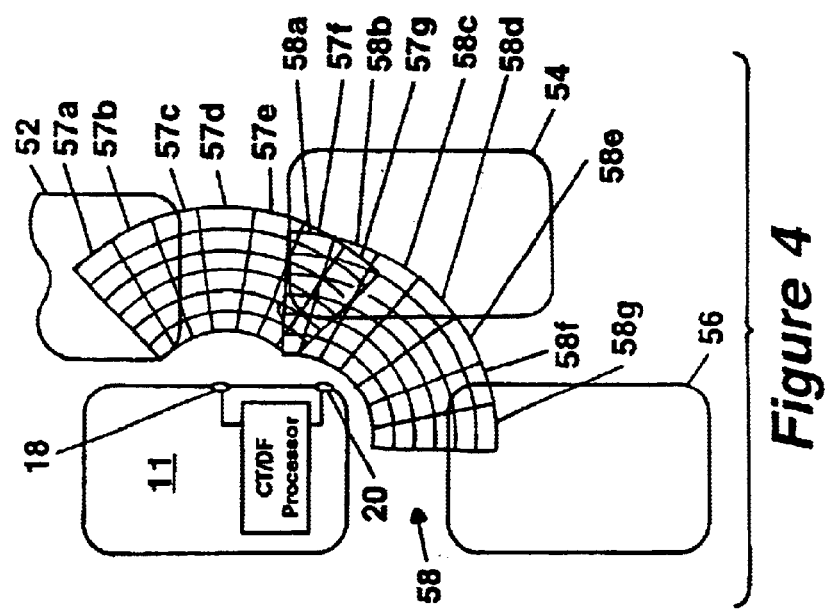

NEAR OBJECT DETECTION SYSTEM

CROSS-REFERENCE TO RELATED APPLICATIONS

This application claims the benefit of U.S. Provisional Application No. 60/226,160, filed on Aug. 16, 2000 and is hereby incorporated herein by reference in its entirety.

STATEMENTS REGARDING FEDERALLY SPONSORED RESEARCH

Not applicable.

BACKGROUND OF THE INVENTION

In view of the dangers associated with automobile travel, there is an ongoing need for enhanced driver awareness. One possible area of increased driver awareness involves detection of objects around a vehicle. As the vehicle approaches objects (e.g. other cars, pedestrians and obstacles) or as objects approach the vehicle a driver cannot always detect the object and perform intervention actions necessary to avoiding a collision with the object. For example a driver of a vehicle may not be able to detect an object in the so-called "blind spot" of the vehicle.

To reduce the number of truck accidents, for example, sensor systems or more simply "sensors" for detecting objects around a truck have been suggested. Such sensors typically include an optical or infrared (IR) detector for detecting obstacles in the path of the vehicle.

In such an application, it is necessary to provide a sensor capable of accurately and reliably detecting objects in the path of the vehicle.

Radar is a suitable technology for implementing a sensor for use in vehicles such as automobiles and trucks. One type of radar suitable for this purpose is Frequency Modulated Continuous Wave (FMCW) radar. In typical FMCW radar, the frequency of the transmitted CW signal linearly increases from a first predetermined frequency to a second predetermined frequency. FMCW radar has the advantages of high sensitivity, relatively low transmitter power and good range resolution.

Aspects of the sensors which contribute to its accuracy and reliability include its susceptibility to noise and the overall precision with which received radio frequency (RF) signals are processed to detect objects within the field of view of the sensor. Susceptibility to noise for example can cause false detections and, even more deleteriously, cause an object to go undetected.

Further significant attributes of the sensors are related to its physical size and form factor. Preferably, the sensor is housed in a relatively small enclosure or housing mountable behind the a surface of the vehicle. For accuracy and reliability, it is imperative that the transmit and receive antenna and circuitry of the sensor are unaffected by attributes of the vehicle (e.g. the vehicle grill, bumper or the like) and that the sensors are mounted to the vehicle in a predictable alignment.

It would, therefore, be desirable to provide a sensor system which is capable of detecting objects all around a vehicle. It would also be desirable to provide a system which can be adapted to provide detection zones around vehicles of different sizes. It would be further desirable to provide a system which can remotely reprogrammed.

SUMMARY OF THE INVENTION

In accordance with the present invention, a near object detection (NOD) system includes a plurality of radio frequency (RF) transmit receive (TR) sensor modules (or more simply "sensors") disposed about a vehicle such that one or more detection zones are deployed about the vehicle. In a preferred embodiment, the sensors are disposed such that each sensor detects object in one or more coverage zones which substantially surround the vehicle. First ones or the plurality of sensors can be mounted in rear and/or front bumpers of the vehicle while second ones of the sensors can be mounted in the side panels of the vehicle. Each of the sensors includes a sensor antenna system which comprises a transmit antenna for emitting or transmitting an RF signal and a receive antenna for receiving portions of the transmitted RF signal which are intercepted by one or more objects within a field of view of the transmit antenna and reflected back toward the receive antenna. Alternatively, a monostatic antenna can be used. The transmit antenna can be provided from a planar array of antenna elements while the receive antenna can be provided from a planar array of antenna elements or from a single row of antenna elements. That is, the transmit and receive antennas can be provided having different numbers and types of antenna elements. The NOD system further includes a receiver circuit, coupled to the receive antenna, for receiving signals from the receive antenna and for determining whether an RF leakage signal coupled from the transmit antenna to the receive antenna exceeds a predetermined leakage signal threshold level.

With this particular arrangement, a NOD system which detects objects in any region about a vehicle is provided. If one the sensors determines that the vehicle is approaching an object or that an object is approaching the vehicle, then the sensor initiates steps which are carried out in accordance with a set of detection rules.

In one embodiment, the system is provided as a distributed processor system in which each of the sensors includes a processor. The sensors are each coupled together to allow the sensors to share information. In another embodiment, each of the sensors is coupled to a central sensor processor which receives information from each of the sensors and processes the information accordingly.

BRIEF DESCRIPTION OF THE DRAWINGS

The foregoing features of this invention, as well as the invention itself, may be more fully understood from the following description of the drawings in which:

FIG. 4 is a diagram of a vehicle surrounded by a plurality of targets with one target appearing in a sensor zone of two different sensors;

FIGS. 4A and 4B are a series of plots corresponding to radar reports in respective local coordinate systems of two different sensors;

FIGS. 4C and 4D are a series of plots corresponding to radar reports from the two different sensors in FIGS. 4A and 4B shown in a global coordinate system of a CT/DF processor;

DETAILED DESCRIPTION OF THE INVENTION

Figure 1:
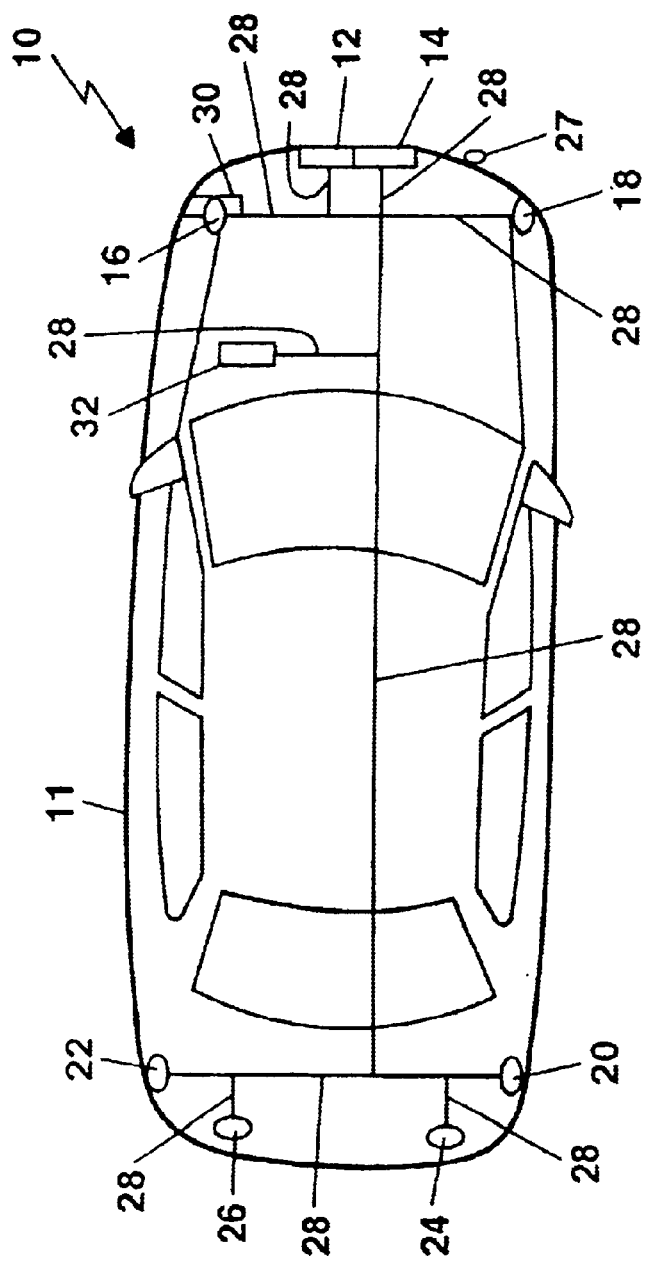
FIG. 1 is a block diagram of a near object detection (NOD) system disposed on a vehicle.

Referring now to FIG. 1, a near-object detection (NOD) system 10 is disposed on a vehicle 11 which is here shown in phantom since it is not properly a part of the NOD system 10. The vehicle 11 may be provided for example, as an automotive vehicle such as car, motorcycle, or truck, or a marine vehicle such as a boat or an underwater surface vehicle or as an agricultural vehicle such as a harvester. In this particular embodiment, the near-object detection system 10 includes a forward-looking sensor (FLS) 12 which may be of the type described in U.S. Pat. No. 5,929,802, entitled "Automotive Forward Looking Sensor Application," issued Jul. 27, 1999, assigned to the assignee of the present invention, a plurality of side-looking sensor (SLS) systems 16–22 (also referred to as side object detection (SOD) systems 16–22) which may be of the type described in co-pending U.S. patent application Ser. No. 09/931,636, entitled "Radar Transmitter Circuitry and Techniques," filed Aug. 16, 2001, assigned to the assignee of the present invention and a plurality of rear-looking sensor (RLS) systems 24, 26. The sensors 16–28 may be coupled to the vehicle using a variety of techniques including but not limited to those described in co-pending U.S. patent application Ser. No. 09/930,868, entitled System and Technique for Mounting a Radar System on a Vehicle, filed Aug. 16, 2001, assigned to the assignee of the present invention. The system 10 can also include a stop and go (SNG) sensor 27. It should be understood that the processing performed by the stop and go sensor 27 and detection zone provided by the sensor 27 can also be provided by the ELS 12 and thus sensor 27 can be omitted. In deciding whether to provide the stop and go processing function from FLS 12 or through a separate sensor (e.g. SNG sensor 27), a trade-off must be made. Exemplary trade off considerations include minimum and maximum desired detection range, zone edge tolerances and reaction time.

The FLS, EOS, SLS, RLS and SNG (if included) systems 12–27 are each coupled to a bus 28 which provides a communication path between each of the sensors 12–27. The bus 28 may be provided, for example, as a local area network (LAN) 28. In some embodiments, it may be desirable to provide the LAN 28 as a wireless LAN.

It should be appreciated that system 10 is a real-time system and thus information should be exchanged/transferred between each of the sensor 12–27 and the processor 30 as rapidly as possible. Thus, bus 28 must be capable of supporting relatively high rates of data transfer.

For example, it may be desirable for bus 28 to have an average bus bandwidth of about 157 kbits per second plus additional for protocol overhead. This bandwidth is computed assuming that the transmit and receive antennas each have seven antenna beams and that each of the seven antenna beams has two (2) tracks on average and that each track is reported at 14 Hz (min) at 100 bytes per track (7×2×14×100×8=157 kbits average bus bandwidth). Thus, although it is possible to have the sensors communicate through a conventional bus as are presently available on vehicles (e.g. the Car Area Network (CAN)), it may be desirable to provide bus 28 as a dedicated bus having at least if not more that the above noted average bus bandwidth.

For a relatively simple configuration, the bus latency should Introduce less than 0.5 m of delay. At a vehicle speed of about 200 km/hr this translates to about 9 milliseconds (ms) or about 300 clock cycles at a clock frequency of about 33 KHz.

It is thus necessary to perform a bus selection tradeoff to best achieve a number of bus and system characteristics including but not limited to utilization, latency, fusion performance, fault tolerance, interference immunity, reliability, and cost.

The sensors are also coupled through the bus 28 to a central tracker/data fusion (CT/DF) processor 30 which will be described below in conjunction with FIGS. 4, 6 and 7. Suffice it here to say that CT/DF processor 30 received information provided thereto from each of the sensors 12–27 and provides information to each of the sensors 12–27. The sensors 12–27 utilize the information provided by the CT/DF processor 30 to improve the overall performance of the system 10 as will become apparent.

Also coupled to CT/DF processor 30 through the bus 28 is a human interface 32. The purpose of the interface 32 is to display or otherwise communicate (e.g. via audio or other signals) information collected by the sensors 12–28 to a driver or other occupant of the vehicle 11. The interface 32 may be provided, for example, as a heads-up display.

In this particular embodiment, the CT/DF processor 30 is shown as a processor which is provided as part of the sensor 12 to which each of the FLS, EOS, SLS, RLS and SNG sensors 12–27 are coupled via the bus 28 or other means. It should be appreciated that in an alternate embodiment, one or more of the FLS, EOS, SLS, RLS and SNG sensors 12–27 may include its own CT/DF processors to perform the processing required to directly share information (e.g. transmit and receive information) with other ones of the sensors 12–27. In the case where it is desired to have redundancy in the CT/DF processing functions, it may be desirable to provide two of the sensors 12–27 with a CT/DF processor 30. In the case where each of the sensors 12–27 includes its own CT/DF system, the near-object detection system could be provided as a distributed processor system. The trade-offs between distributed vs. single master processor include, but are not limited to, reliability, bus bandwidth, processing latency, and cost.

In one embodiment the CT/DF processor 30 provides specific information to specific a one or ones of the sensors 12–27 and in other embodiments the CT/DF processor 30 provides all information to each of the sensors 12–27.

As shown in FIG. 1, at least one sensor 12–27 includes a central tracker data fusion processor 30 and each of the sensors 12–27 send data over the bus 28 to the CT/DF processor 30. Regardless of whether the near-object detection system includes a single or multiple CT/DF processors 30, the information collected by each of the sensors 12–27 is shared and the processor (or processors in the case of a distributed system) implements a decision or rule tree. For example, as shown in FIG. 1, the sensor processor is coupled to the airbag system of the vehicle. In response to signals from one or more of the FLS, EOS, SLS, and RLS systems, the sensor processor may determine that it is appropriate to "pre-arm" the airbag of the vehicle. Other examples include braking and steering boost, transmission control, alarms, born and/or flasher activation.

The NOD system 10 may thus be used for a number of functions including but not limited to blind spot detection, lane change detection, pre-arming of vehicle air bags and to perform a lane stay function, and the above-mentioned pre-arm airbag function. The CT/DF processor 30 thus receives all information provided thereto and optimizes performance of the NODS system for the entire vehicle. Field of view/detection zones or thresholding may be dynamically controlled based on track info from the entire system. Track hand-offs may allow sensors to respond quicker or more reliably given cue data by avoiding or reducing acquisition verification steps.

The pair of RLS sensors 24, 26 can utilize a triangulation scheme to detect objects in the rear portion of the vehicle. Location (distance and direction) of an object may be determined from two distance reading from two sensors without the need for any direction finding information. The intersection of two circles drawn around each sensor with radius equal to its range measurement provides two solutions for the location of the object, one of which is a practical impossibility located inside the host vehicle 11 and can, therefore, be eliminated.

It should be appreciated that one or more of the sensors 12–27 may be removably deployed on the vehicle 11. That is, in some embodiments the SLS, RLS, and FLS sensors may be disposed external to the body of the vehicle (i.e. disposed on an exposed surface of the vehicle body), while in other systems one or more of the sensors 12–27 may be embedded into bumpers or other portions of vehicle (e.g. doors, panels, quarter panels, and vehicle front ends, and vehicle rear ends). Its is also possible to provide a system which is both mounted inside the vehicle (e.g., in the bumper or other location) and which is also removable.

Figure 2:
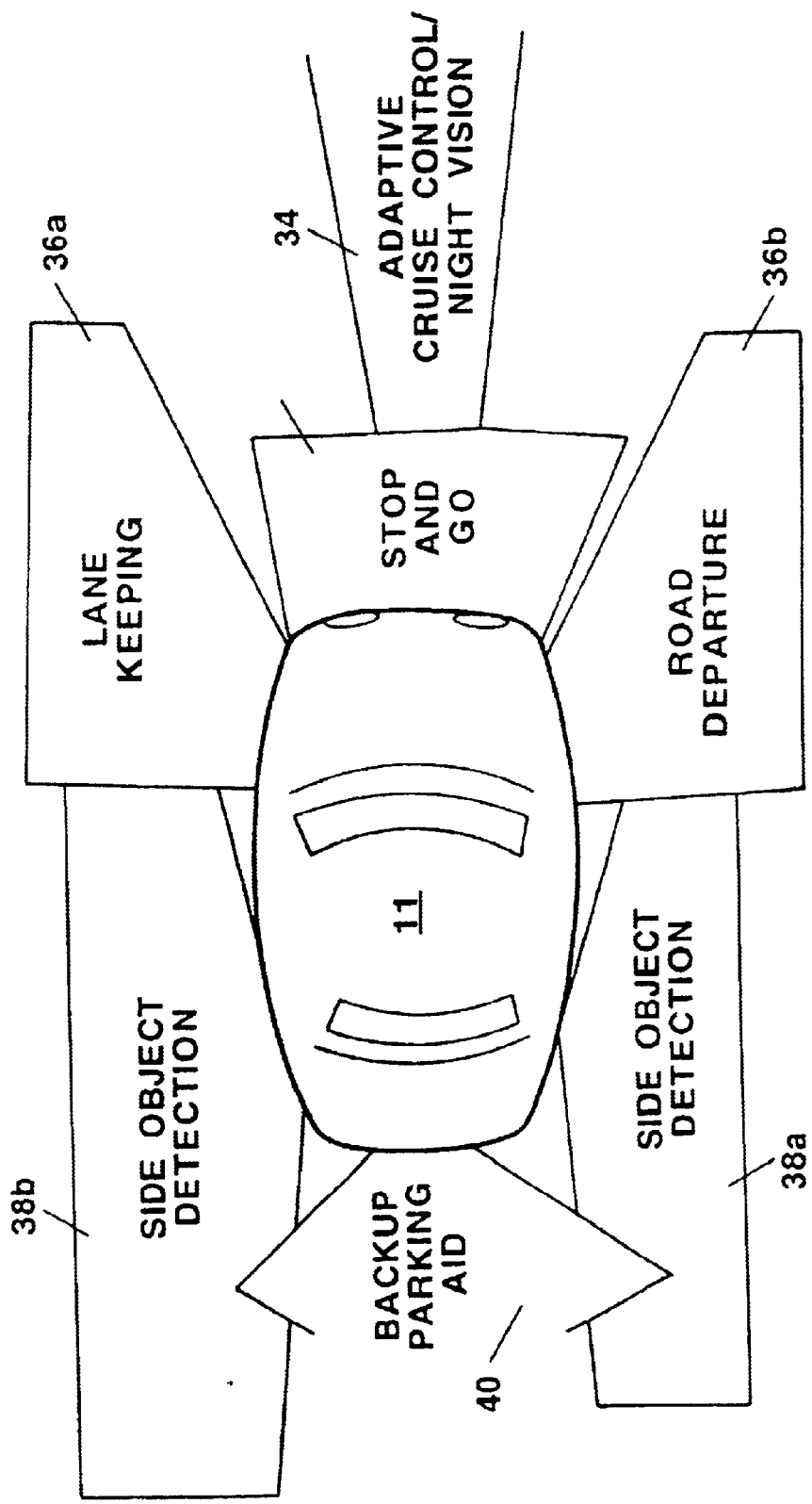
FIG. 2 is a diagram of vehicle surrounded by a cocoon of sensor zones provided from a NOD system of the type shown in FIG. 1.

Referring now to FIG. 2, in which like elements of Figure are provided having like reference designations, the vehicle 11 on which a NOD system is disposed is shown surrounded by a plurality of detection zones 32–40 which form a radar cocoon around the vehicle. It should be appreciated that different zones of the sensors 12–27 (FIG. 1) provide different ones of the detection zones 32–40. In particular, sensors 12 and 14 provide adaptive cruise control and night vision zone 34, sensor 16 provides a lane keeping zone, sensor 18 provides road departure zone, 36b respectively, sensors 20, 22 provide side object detection zones 38a, 38b respectively, sensors 24, 26 provide backup and parking aid zone 40 and sensor 27 provides stop and go zone 42. The Adaptive Cruise Control/Night Vision zone is of limited angular extent and characterized by long range, e.g., >50 m, and high velocity object. The road departure and lane keeping zones are shorter range and wider angular extent with a moderate range of velocities. The stop-and-go and back-up/parking aid zones are wide in angular extent, but very short range and only need to operate over a smaller range of velocities. The back-up/parking aid zone may also provide rear collision warning information during normal driving condition. The side object detection zones have wide angular extent, are relatively short in range and must operate over a high range of velocities.

It should also be appreciated that the size, shape and other characteristics of each of the sensor zones can be modified. There are many reasons for wanting to change one or more characteristics of a detection zone including car size and peripheral vision preference. Other possible reasons for wanting to change the detection zone size include towing a trailer, lane size change, and personal preference among vehicle operators.

Since the characteristics of a single sensor can be changed to allow the sensor to provide detection capabilities in coverage zones of different sizes and shapes, the sensor can also be used on a vehicle which is larger or smaller than the vehicle as shown in FIG. 2. Thus, modification of a coverage zone provided by a particular sensor can be accomplished by programming the sensor.

In one embodiment, the coverage zone can be modified by adjusting the range gates of the sensor as described in co-pending U.S. patent application 09/930,867, entitled "Technique for Changing a Range Gate and Radar Coverage," filed Aug. 16, 2001 assigned to the assignee of the present invention and incorporated herein by reference. In another embodiment, the coverage zone is changed by using a reconfigurable antenna. In still another embodiment, the reconfigurable antenna is provided by using microelectromechanical (MEMs) devices which are used to change beam shape and thus beam coverage. The MEMS can change the aperture shape and thus the shape of the beam.

It should be noted that with the particular configuration of sensors shown in FIG. 1, seven coverage zones 32–40 are provided as shown in FIG. 2. Each of the coverage zones utilize RF detection systems. The RF detection system utilizes an antenna system which provides multiple beams in each of the coverage zones. In this manner, the particular direction in which another object approaching the vehicle or vice-versa can be found. In one particular embodiment, the FLS sensor 12 (FIG. 1) utilizes an antenna system which includes eight separate antenna beams. Therefore, the RF system can operate in a manner similar to that described in the above-referenced Pat. No. 5,929,802. Similarly, the sensors 16–27 utilizes an antenna system which includes seven separate antenna beams. Therefore, the RF system can operate in a manner similar to that described in the above-referenced U.S. patent application Ser. No. 09/931,636, entitled "Radar Transmitter Circuitry and Techniques."

Figure 3:
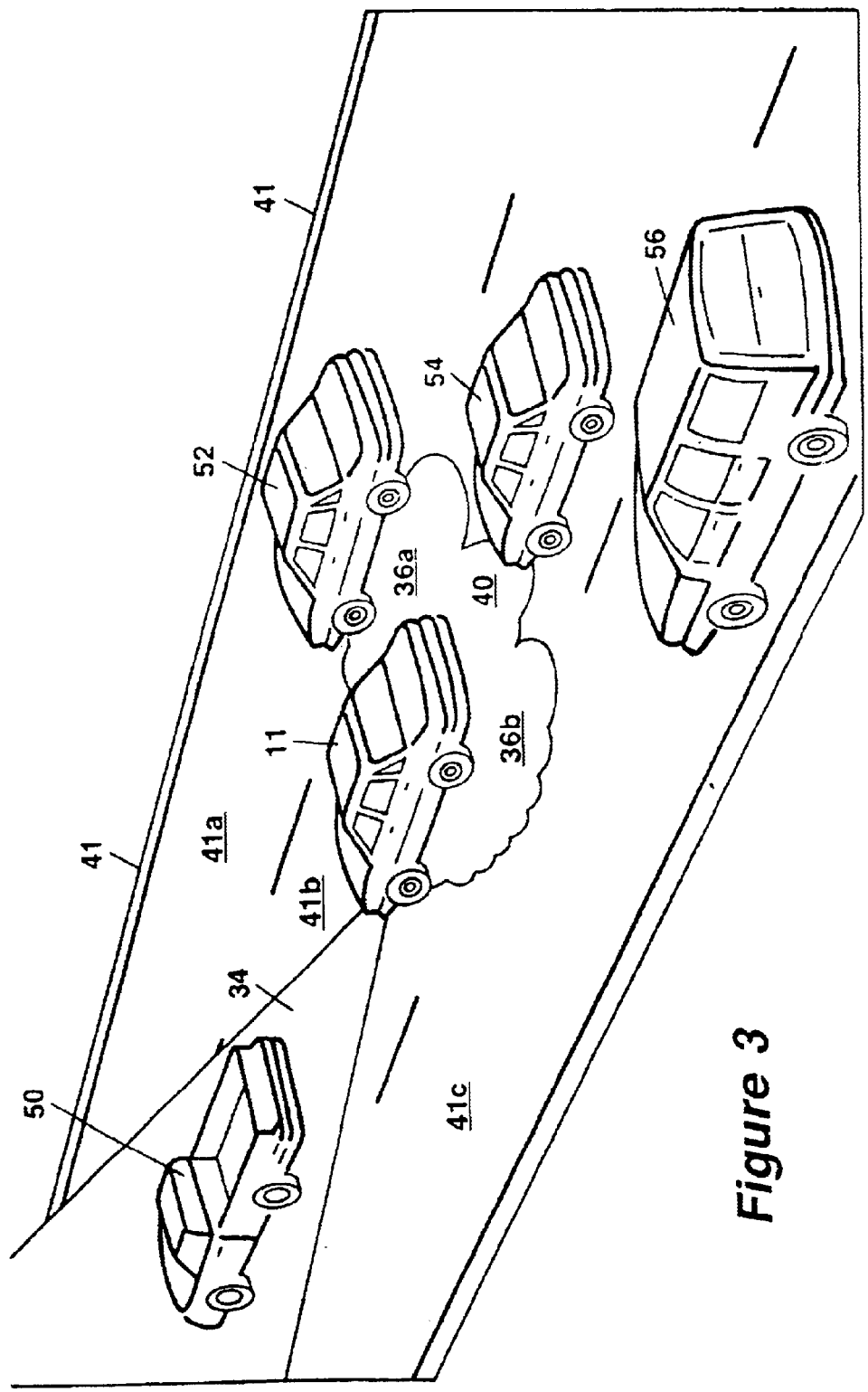
FIG. 3 is a diagram of a vehicle surrounded by a plurality sensor zones provided from a NOD system of the type shown in FIG. 1 and traveling a long a road with other vehicles in proximity to it.

Referring now to FIG. 3, a vehicle 11 having a NOD system disposed thereon travels on a road 41 having three lanes 41a, 41b, 41c. Vehicle 11 is in lane 41b and a first vehicle 50 is in front of the vehicle 11 and appears in detection zone 34. A second vehicle 52 is to the right of vehicle 11 in lane 41 a and appears in detection zone 36a. A third vehicle 54 is behind vehicle 11 in lane 41b and appears in detection zone 40. A fourth vehicle 56 is behind and to the left of vehicle 11 in lane 41c. Since vehicle 56 is relatively far away from vehicle 11, vehicle 56 does not appear in any detection zone and thus is not sensed by the NOD system disposed on vehicle 11.

As shown in FIG. 3, the NOD system has identified three vehicles or targets 50, 52, 54 in proximity to the vehicle 11. The NOD system maintains information on each target 50–54 and provides such information to a user (e.g. via display 32 in FIG. 1) or performs certain functions (e.g. pre-arm airbag system of the vehicle).

Furthermore, since the sensors 12–27 are in communication with CT/DF processor 30 and with each other, the sensors can share information about targets. For example, assume sensor 18 mounted on vehicle 11 detects the target 52 and begins to track the target 52. After a period of time the target 52 may begin to accelerate past the vehicle 11. If the sensor 18 is able to detect that target 52 will move past vehicle 11 on the right hand side, the sensor 18 can provide this information to the FLS 12. The information may be in the form of a track file, or similar set of data indicating a target in the vehicle 's 11 coordinate system. Such a track file allows the FLS to have present and predicted target positional information before the FLS can actually observe/detect the target. Thus, the FLS 12 is provided advance information about a confirmed target (i.e. a "real" target) prior to the FLS 12 itself actually detecting, acquiring, confirming and tracking the target. Detecting refers to a target return being above some predetermined threshold. Acquiring uses predetermined rules used to ensure that a detected target is a "real" target in order to reduce false alarms.

Providing the FLS with advance information (e.g. the information that a confirmed target will be entering its field of view from the right hand side of the vehicle 11) may allow the FLS 12 to proceed to a target tracking process without first performing target detection, target acquisition or target confirmation processes or at least with a minimal amount of processing required to perform such processes. Since the FLS 12 can confirm the target and target track via the information from sensor 18 rather than by spending processing time confirming that the vehicle 52 is indeed a real target entering the field of view of the FLS 12, the FLS is able to perform more processing functions such as tracking of multiple targets and other functions to be described below. Thus, providing advance information to the FLS allows the FLS 12 to more rapidly track a target and in particular allows the FLS 12 to more rapidly detect and track-called so-called "cut-in" targets (i.e. targets which quickly move into lane 41b in front of the vehicle 11).

More importantly perhaps, it is advantageous for the FLS 12 to have such advance knowledge since by providing the FLS 12 with information related to the path of target 52 prior to the target 52 entering the detection zone of the FLS 12, the FLS 12 is able to initiate, or in some cases even to carry out, processes related to the engagement of defensive measures including but not limited to pre-arming of air bags, automatic adjustment of automatic cruise control (ACC) systems and pre-arming braking systems. Thus the FLS is able to execute other functions related to operation of the vehicle.

It should be appreciated that the CT/FS processor is both a "target tracker" which performs a tracking function and a "data fuser" which performs a fusing function. The central tracking function of the CT/DF processor is to receive and maintain all tracks from various sensors (e.g. sensors 12–27 in FIG. 1) in the system 10 (FIG. 1) and to also to aid other sensors in their performance as described above.

Referring now to FIGS. 4–4D in which like element, FIGS. 1–3 are provided having like reference designations in operation, multiple ones of the sensors 12–27 (FIG. 1) can track the same target. As shown in FIG. 4 for example, the targets 52 and 54 both appear in the field of view of the sensor 18 and thus the sensor 18 tracks both of these targets. Sensor 18 has multiple (seven) antenna beams 57a–57g which corresponding to rows in the plot of FIG. 4A while columns correspond to range cells. Therefore, the closest detection of target 52 in the leftmost beam corresponds to detection 59a. Similarly, sensor 18 detection at a slightly longer range of target 54 in the right-most beam corresponds to cell 59d. Similarly, the targets 54 and 56 both appear in the field of view of the sensor 20 and thus the sensor 20 tracks both of these targets. Sensor 20 has multiple antenna beams 58a–58g which correspond to rows in the plot of FIG. 4B while columns correspond to range cells. Therefore, the closest detection of target 54 in the leftmost beam corresponds to detection 60a. Similarly, sensor 20 detection at a slightly longer range of target 56 in the right-most beam corresponds to cell 60d. Therefore, both sensors 18, 20 track the target 54.

Since sensors 18 and 20 are located on different points of the vehicle 11, the sensors track the targets from two different aspect angles. Moreover, each of the sensors 18, 20 has its own unique local coordinate system. Thus, the sensors 18, 20 are alone unable to determine that they are each tracking the same target and both sensors 18, 20 provide their track information to the CT/DF processor 30 as two different track files.

The CT/DF processor 30, on the other hand, has information which identifies the physical location on the vehicle 11 of each of the sensors 12–27; the relative position of the sensors on a particular vehicle remains fixed allowing the CT/DF to transform sensor data to a vehicle fixed coordinate system and to transmit target track data transformed into any of the sensor's convenience coordinate system.

The CT/DF processor 30 is thus able to transform coordinate information provided from each of the sensors 18, 20 to its own global coordinate system. Thus the CT/DF processor 30 views the position of each target detected by each of the sensors 18, 20 (and generally by any of the sensors 12–27) in a single coordinate system.

Since all target information appears in a single coordinate system, the CT/DF is able to rapidly identify those targets which are being tracked by multiple sensors. Thus, the CT/DF processor 30 is able to fuse data from each track provided by each sensor into a common filter, or simply select the highest quality data, as determined by tracking noise, e.g. sensors 18, 20, to assist and improve the performance of other sensors and thus improve the performance of the overall NOD system.

In one particular embodiment, the process performed by the CT/DF processor to fuse targets begins by transforming all local target data into a global coordinate system. This can be accomplished by performing one or more coordinate transformations. Then, the CT/DF processor tracks the association of each sensor with prior fused tracks. Association is the process of comparing 'new' data and its assumed quality (expected error statistics) with existing track projections and its assumed quality. Incoming data which is deemed likely to be consistent (correlate) with a track due to a small location difference compared to the assumed tracking and measurement error is said to associate, and the incoming data is assumed to be from the same physical target as the track. Incoming data which is deemed unlikely to be consistent with a track due to a high degree of location difference compared to the assumed tracking and measurement error are said to not associate. Next, the CT/DF processor tracks recursive updates and the CT/DF processor initiates tracks for unassociated data since these are assumed to be previously untracked target and then the CT/DF processor drops tracks when out of view.

Figure 5:
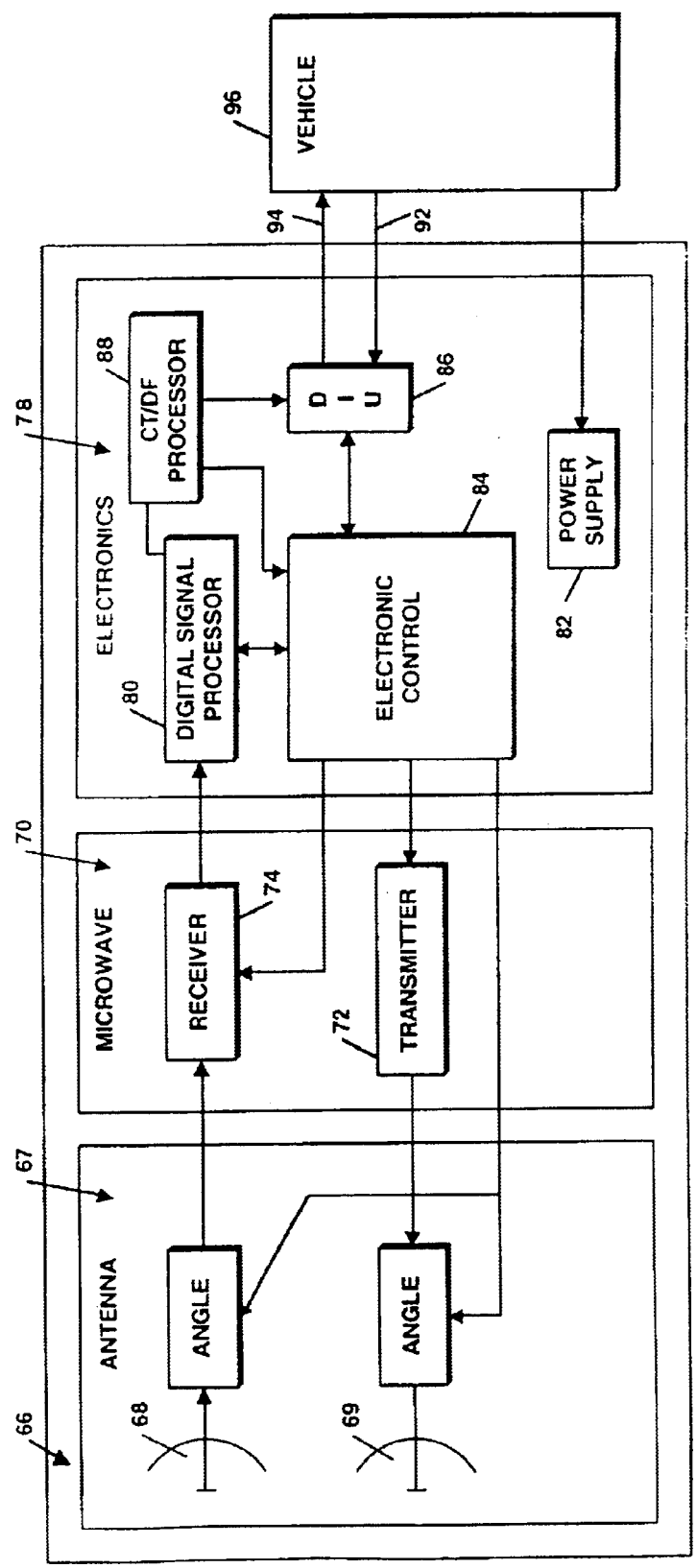
FIG. 5 is a block diagram of an near object detection (NOD) system having a central tracker/data fusion (CT/DF) processor.

Referring now to FIG. 5, a radar system 66 includes an antenna portion 67 having transmit and receive antennas 68, 69, a microwave portion 70 having both a transmitter 72 and a receiver 74, and an electronics portion 78 containing a digital signal processor (DSP) 80, a power supply 82, control circuits 84 and a digital interface unit (DIU) 86. The transmitter 72 includes a digital ramp signal generator for generating a control signal for a voltage controlled oscillator (VCO), which may be provided for example as the type described in aforementioned co-pending U.S. Patent Application entitled "Radar Transmitter Circuitry And Techniques."

The radar system 66 utilizes radar technology to detect one or more objects, or targets in the field of view of the system 66 and may be used in various applications. In the illustrative embodiment, the radar system 66 may be of the type which can be used as a sensor module in a near object detection system of an automotive radar system such as NOD system 10 described above in conjunction with FIG. 1.

In particular, radar system 66 is appropriate for use as a side object detection (SOD) module or sensor such one of sensors 16–27 described above in conjunction with FIG. 1. As described above, such sensors are adapted for mounting on an automobile or other vehicle 96 for the purpose of detecting objects, including but not limited to other vehicles, trees, signs, pedestrians, and other objects which can be located proximate a path on which the vehicle is located. As will be apparent to those of ordinary skill in the art, the radar system 66 is also suitable for use in many different types of applications including but not limited to marine applications in which radar system 60 can be disposed on a boat, ship or other sea vessel.

The transmitter 72 operates as a Frequency Modulated Continuous Wave (FMCW) radar, in which the frequency of the transmitted signal linearly increases from a first predetermined frequency to a second predetermined frequency. FMCW radar has the advantages of high sensitivity, relatively low transmitter power and good range resolution. However, it will be appreciated that other types of transmitters may be used.

Control signals are provided by the vehicle 96 to the radar system 60 via a control signal bus 92 and may include a yaw rate signal corresponding to a yaw rate associated with the vehicle 96 and a velocity signal corresponding to the velocity of the vehicle. The DSP 80 processes these control signals and radar return signals received by the radar system 66, in order to detect objects within the field of view of the radar system 66.

The radar system 66 further includes a CT/DF processor 88. The DSP 80 is coupled through the CT/DF processor 88 to a digital interface unit (DIU) 86. In other embodiments of the radar system 60 the CT/DF processor 88 may be omitted in which case the DSP 80 is directly coupled to the digital interface unit 86. CT/DF processor 88 may be of the type described above in conjunction with FIGS. 1–3 and to be described further below. Thus the CT/DF processor 88 receives signals from DSP 80 and also receives information through the DIU 86 from other radar systems 66 disposed about the vehicle 96. The data may be in the form of a track file, or raw detection data in the sensor's coordinate system. The CT/DF may also provide cue data to the sensor dependent on target track initiated from detection from other sensors.

The radar system 66 provides to the vehicle 96 one or more output signals characterizing an object within its field of view via an output signal bus 94 to the vehicle. These output signals may include a range signal indicative of a range associated with the target, a range rate signal indicative of a range rate associated with the target and an azimuth signal indicative of the azimuth associated with the target relative to the vehicle 96. The output signals may be coupled to a control unit of the vehicle 96 for various uses such as in an intelligent cruise control system or a collision avoidance system.

The antenna assembly 67 includes the receive antenna 68 for receiving RF signals and the transmit antenna 69 for transmitting RF signals. In this particular example, the radar system 66 corresponds to a bistatic radar system since it includes separate transmit and receive antennas positioned proximate one another. The antennas 68, 69 provide multiple beams at steering angles that are controlled in parallel as to point a transmit and a receive beam in the same direction. Various circuitry for selecting the angle of the respective antennas 68, 69 is suitable, including a multi-position switch. An appropriate antenna system may be provided for example as the type described in the aforementioned co-pending U.S. patent application Ser. No. 09/932,574, entitled "Switched Beam Antenna Architecture."

Figure 6:
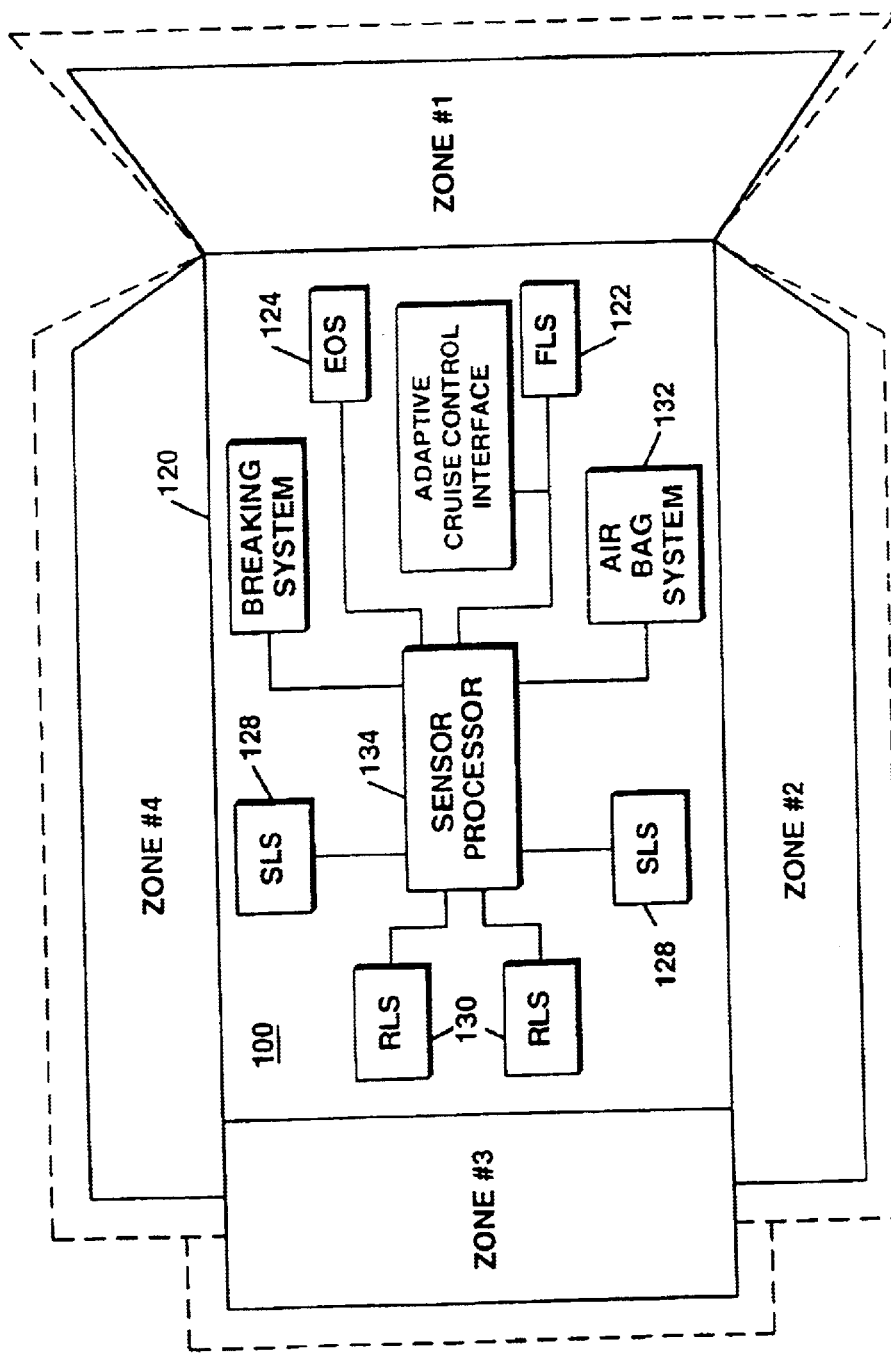
FIG. 6 is a block diagram of an near object detection (NOD) system disposed on a vehicle with the vehicle having a single sensor processing system.

Referring also to FIG. 6, an illustrative application for the radar system 10 of FIG. 1 is shown in the form of an automotive near object detection (NOD) system 100. The NOD system 100 is disposed on a vehicle 120 which maybe provided for example, as an automotive vehicle such as car, motorcycle, or truck, or a marine vehicle such as a boat or an underwater vehicle or as an agricultural vehicle such as a harvester. In this particular embodiment, the NOD system 100 includes a forward-looking sensor (FLS) system 122, an Electro-Optic Sensor (EOS) system 124, a plurality of side-looking sensor (SLS) systems 128 or equivalently side object detection (SOD) systems 128 and a plurality of rear-looking sensor (RLS) systems 130. In the illustrative embodiment, the radar system 10 of FIG. 1 which is shown in greater detail in FIG. 3 is a SOD system 128.

Each of the FLS, EOS, SLS, and RLS systems is coupled to a sensor processor 134. In this particular embodiment, the sensor processor 134 is shown as a central processor to which each of the FLS, EOS, SLS, and RLS systems is coupled via a bus or other means. It should be appreciated that in an alternate embodiment, one or more of the FLS, EOS, SLS, and RLS systems may include its own processors, such as the DSP 80 of FIG. 4, to perform the processing described below. In this case, the NOD system 100 would be provided as a distributed processor system.

Regardless of whether the NOD system 100 includes a single or multiple processors, the information collected by each of the sensor systems 122, 124, 128, 130 is shared and the processor 134 (or processors in the case of a distributed system) implements a decision or rule tree. The NOD system 100 may be used for a number of functions including but not limited to blind spot detection, lane change detection, pre-arming of vehicle air bags and to perform a lane stay function. For example, the sensor processor 134 may be coupled to the airbag system of the vehicle 132. In response to signals from one or more of the FLS, EOS, SLS, and RLS systems, the sensor processor may determine that it is appropriate to "pre-arm" the airbag of the vehicle. Other examples are also possible.

The EOS system 124 includes an optical or IR sensor or any other sensor which provides relatively high resolution in the azimuth plane of the sensor. The pair of RLS systems 130 can utilize a triangulation scheme to detect objects in the rear portion of the vehicle. The FLS system 122 is described in the aforementioned U.S. Pat. No. 5,929,802. It should be appreciated that each of the SLS and RLS sensors may be provided having the same antenna system.

Each of the sensor systems is disposed on the vehicle 120 such that a plurality of coverage zones exist around the vehicle. Thus, the vehicle is enclosed in a cocoon-like web or wrap of sensor zones. With the particular configuration shown in FIG. 2, four coverage zones 68a–68d are used. Each of the coverage zones 68a–68d utilizes one or more RF detection systems. The RF detection system utilizes an antenna system which provides multiple beams in each of the coverage zones 68a–68d. In this manner, the particular direction from which another object approaches the vehicle or vice-versa can be found. One particular antenna which can be used is described in U.S. patent application Ser. No. 09/931,633, entitled "Slot Antenna Element For An Array Antenna," filed Aug. 16, 2001 and assigned to the assignee of the present invention and the aforementioned U.S. patent application Ser. No. 09/932,574, entitled "Switched Beam Antenna Architecture."

It should be appreciated that the SLS, RLS, and the FLS systems may be removably deployed on the vehicle. That is, in some embodiments the SLS, RLS, and FLS sensors may be disposed external to the body of the vehicle (i.e. on an exposed surface of the vehicle body), while in other systems the SLS, RLS, and FLS systems may be embedded into bumpers or other portions of vehicle (e.g. doors, panels, quarter panels, vehicle front ends, and vehicle rear ends). It is also possible to provide a system which is both mounted inside the vehicle (e.g., in the bumper or other location) and which is also removable. The system for mounting can be of one of the types described in U.S. patent application Ser. No. 09/930,868, entitled "System And Technique For Mounting A Radar System On A Vehicle," filed Aug. 16, 2001 and assigned to the assignee of the present invention and U.S. patent application Ser. No. 09/931,276, entitled "Portable Object Detection System," filed Aug. 16, 2001 and assigned to the assignee of the present invention and these applications are incorporated by reference herein.

Figure 7:
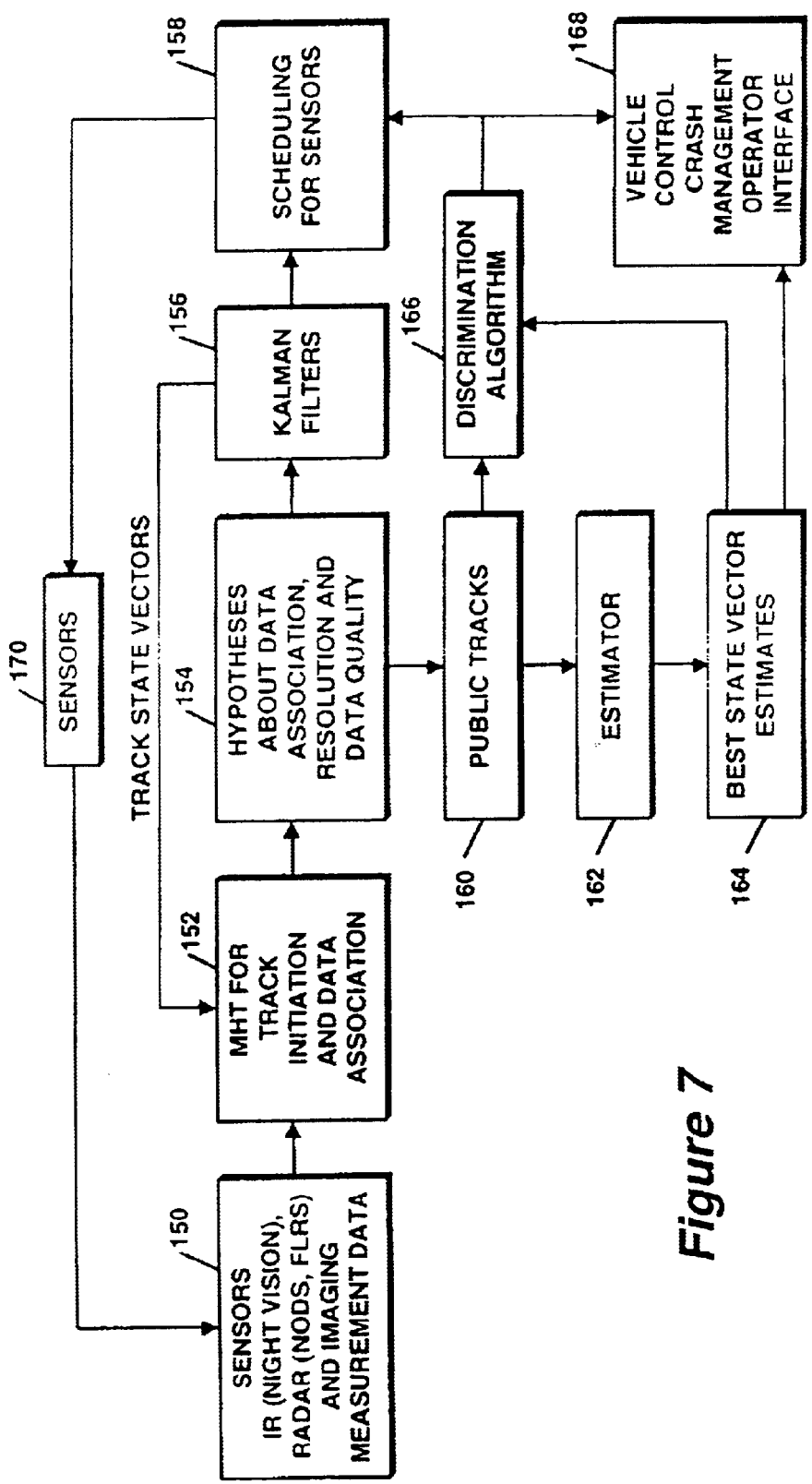
FIG. 7 is a flow diagram of the processing steps needed to perform a fusing operation.

Referring now to FIG. 7, a flow diagram which shows the processing performed by a CT/DF processor such as processor 30 (FIG. 1), processor 88 (FIG. 4) or processor 134 (FIG. 5) begins by collecting sensor data including infrared (IR), radar and imaging measurement data from sensors such as the sensors 12–27 described above in conjunction with FIG. 1. The sensor data is provided to an Multiple Hypothesis Tracker (MHT) for track initiation and data association as shown in block 152. As shown in step 154 a hypothesis about data association, resolution and data quality is then made. The data is then processed in a state prediction filter such as a Kalman filter as shown in block 150.

Processing then proceeds to block 160 where public tracks are formed. Public tracks are tracks developed from data from any of the sensors, and data from such public tracks may ultimately provide data for sensor operation/ resource scheduling. The public track information is provided to both an estimator as shown in block 162 and to a discrimination processor as shown in block 166.

The estimator output is provided to a best state vector estimator where best state vector estimates are provided as shown in block 164. The best state vector estimates are provided to the discrimination processor of block 166 and also to a vehicle control crash management operator interface as shown in block 168. The output of the discrimination process is provided to both the vehicle control crash management operator interface as shown in block 168 and to a scheduler for the sensors as shown in block 158. The scheduler for the sensors notifies the sensors in block 170 as to when the sensors should provide data as shown in block 150.

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims.

All publications and references cited herein are expressly incorporated herein by reference in their entirety.

What is claimed is:

1. A near object detection system adapted to be coupled to a vehicle having a plurality of vehicle systems, the near object detection system comprising:

a plurality of sensors, each of said plurality of sensors for providing data associated with a range cell in one of a plurality of predetermined coverage zones;

a processor, coupled to receive and process the range cell data from one or more of said plurality of sensors, said processor adapted to provide a processor output signal to one or more of the plurality of vehicle systems, wherein said processor includes a target tracker portion adapted to maintain track information from a plurality of targets with the track information being generated from the range cell data provided by the one or more of said plurality of sensors; and means, coupled to each of said plurality of sensors and to said processor, for sharing information between at least some of said plurality of sensors.

2. The system of claim 1 wherein said processor corresponds to a central sensor processor coupled to each of said plurality of sensors.

3. The system of claim 1, wherein said processor is provided as a distributed processor provided from a plurality of sensor processors, each of said plurality of sensor processors disposed in a corresponding one of said plurality of sensors, and each of said plurality of sensor processors having communication means for allowing information to be shared between at least some of said plurality of sensor processors.

4. A near object detection system for a vehicle, comprising:

a plurality of sensors disposed about a perimeter of the vehicle, each of said plurality of sensors providing data associated with a range cell in a respective one of a plurality of predetermined coverage zones about the perimeter of the vehicle; and wherein each of said plurality of sensors has a respective predetermined range, angular extent, and velocity range based upon respective coverage zone requirements; and a processor, coupled to one or more of plurality of sensors, said processor adapted to receive and process the range cell data provided thereto from the one or more of said plurality of sensors, said processor including a target tracker portion adapted to maintain track information from a plurality of targets with the track information being generated from the range cell data.

5. The system according to claim 4, wherein the plurality of predetermined coverage zones include two or more of an adaptive cruise control/night vision zone, a lane keeping zone, a road departure zone, a side object detection zone, a backup and parking aid zone, and a stop and go zone.

6. A near object detection system, comprising:

a plurality of sensors, each of said plurality of sensors for providing detection coverage in a respective one of a plurality of predetermined coverage zones;

a multiple hypothesis tracker for processing data from each of said plurality of sensors to make a hypothesis about data association, resolution, and data quality;

a prediction filter coupled to said multiple hypothesis tracker for scheduling the plurality of sensors;

a public track former, coupled to said plurality of sensors, for generating data to control operation of said plurality of sensors;

an estimator/best state vector subsystem coupled to said public track former; and a vehicle control crash management interface coupled to said estimator/best state vector subsystem and to said public track former.

7. The system according to claim 6, wherein the plurality of predetermined coverage zones includes two or more of an adaptive cruise control/night vision zone, a lane keeping zone, a road departure zone, a side object detection zone, a backup and parking aid zone, and a stop and go zone.

8. The system of claim 1, wherein said processor further includes a data fuser portion adapted to fuse the plurality of track information into a common filter to increase performance of said plurality of sensors.

9. The system of claim 1, wherein said plurality of sensors, each include at least one of:

an infrared (IR) sensor and a radar sensor.

10. The system of claim 9, wherein at least one of said plurality sensors comprises:

a transmit antenna for transmitting an FMCW frequency in a plurality of transmit beams; and a receive antenna for receiving the FMCW frequency in a plurality of receive beams, which, in combination the transmit beams, provides the plurality of a predetermined coverage zones.

11. The system of claim 10, having at least one transmit beam and at least one receive beam.

12. The system of claim 10, wherein each of the plurality of predetermined coverage zones has respective zone characteristics, at least one of which can be statically changed.

13. The system of claim 12, wherein at least one of the zone characteristics can be dynamically changed to provide an alteration of a time period upon which at least one of said plurality of sensors processes a particular transmit beam and a particular receive beam.

14. The system of claim 9, wherein said processor is provided from a central processor.

15. The system of claim 9, wherein said processor comprises two or more distributed processors.

* * * * *

UNITED STATES PATENT AND TRADEMARK OFFICE
CERTIFICATE OF CORRECTION

PATENT NO.    : 6,784,828 B2
DATED         : August 31, 2004
INVENTOR(S)   : Michael Joseph Delcheccolo et al.

It is certified that error appears in the above-identified patent and that said Letters Patent is hereby corrected as shown below:

Column 1,
Line 19, delete "vehicle a" and replace with -- vehicle, a --.
Line 21, delete "example a" and replace with -- example, a --.
Line 45, delete "noise for example can" and replace with -- noise, for example, can --.
Line 52, delete "the a surface" and replace with -- the surface --.
Line 63, delete "remotely reprogrammed." and replace with -- remotely be re-programmed. --.

Column 2,
Line 5, delete "object" and replace with -- objects --.
Line 29, delete "one the" and replace with -- one of the --.
Lines 50-51, delete "plurality sensor" and replace with -- plurality of sensor --.
Line 52, delete "a long" and replace with -- along --.

Column 3,
Line 12, delete "such as car," and replace with -- such as a car, --.
Lines 30-31, delete "entitled System and Technique for Mounting a Radar System on a Vehicle, filed" and replace with -- entitled "System and Technique for Mounting a Radar System on a Vehicle", filed --.
Line 36, delete "ELS 12" and replace with -- FLS 12 --.
Line 51, delete "sensor 12-27" and replace with -- sensors 12-27 --.

Column 4,
Line 2, delete "Introduce" and replace with -- introduce --.
Line 45, delete "to specific a one" and replace with -- to a specific one --.
Line 52, delete "CT/DF processors" and replace with -- CT/DF processor --.
Line 62, delete "born" and replace with -- horn --.

Column 5,
Line 25, delete "of vehicle" and replace with -- of the vehicle --.
Line 27, delete "Its is" and replace with -- it is --.
Line 30, delete "Figure are" and replace with -- Figure I are --.

Column 7,
Line 22, delete "track-called" and replace with -- track --.
Line 39 delete "also to aid" and replace with -- also aid --.
Line 48, delete "corresponding" and replace with -- corresponds --.

UNITED STATES PATENT AND TRADEMARK OFFICE
CERTIFICATE OF CORRECTION

PATENT NO. : 6,784,828 B2
DATED : August 31, 2004
INVENTOR(S) : Michael Joseph Delcheccolo et al.

It is certified that error appears in the above-identified patent and that said Letters Patent is hereby corrected as shown below:

Column 8,
Line 46, delete "target" and replace with -- targets --.

Column 11,
Line 7, delete "vehicle" and replace with -- the vehicle --.
Line 28, delete "step 154 a" and replace with -- step 154, a --.

Column 12,
Line 34, delete "more of plurality" and replace with -- more of said plurality --.

Column 13,
Line 15, delete "combination the" and replace with -- combination with the --.
Line 16, delete "of a" and replace with -- of --.

Signed and Sealed this

Tenth Day of May, 2005

JON W. DUDAS
*Director of the United States Patent and Trademark Office*